(12) United States Patent
Somerville et al.

(10) Patent No.: US 10,348,112 B2
(45) Date of Patent: Jul. 9, 2019

(54) POWER MANAGEMENT CIRCUIT

(71) Applicant: Dialog Semiconductor (UK) Limited, London (GB)

(72) Inventors: Alan Somerville, Chippenham (GB); Pei-Cheng Huang, Taipei (TW)

(73) Assignee: Dialog Semiconductor (UK) Limited, London (GB)

( * ) Notice: Subject to any disclaimer, the term of this patent is extended or adjusted under 35 U.S.C. 154(b) by 51 days.

(21) Appl. No.: 15/267,259

(22) Filed: Sep. 16, 2016

(65) Prior Publication Data

US 2017/0085080 A1  Mar. 23, 2017

(30) Foreign Application Priority Data

Sep. 17, 2015 (GB) .................................. 1516526.9
Sep. 18, 2015 (GB) .................................. 1516590.5

(51) Int. Cl.
*H02J 1/00* (2006.01)
*H02J 7/00* (2006.01)
*H02M 3/158* (2006.01)
*H02J 7/02* (2016.01)

(52) U.S. Cl.
CPC ............. *H02J 7/0052* (2013.01); *H02J 7/02* (2013.01); *H02M 3/1582* (2013.01); *H02J 2007/0059* (2013.01)

(58) Field of Classification Search
CPC .................................................. H02M 31/1582
See application file for complete search history.

(56) References Cited

U.S. PATENT DOCUMENTS

| | | | |
|---|---|---|---|
| 7,336,056 B1 * | 2/2008 | Dening ................ | H02M 3/157 323/222 |
| 2004/0135562 A1 * | 7/2004 | Oden .................... | H02M 3/158 323/282 |
| 2012/0229110 A1 * | 9/2012 | Huang ................ | H02M 3/1582 323/282 |
| 2013/0021015 A1 * | 1/2013 | Moussaoui ......... | H02M 3/1582 323/311 |

* cited by examiner

*Primary Examiner* — Rexford N Barnie
*Assistant Examiner* — Terrence R Willoughby
(74) *Attorney, Agent, or Firm* — Saile Ackerman LLC; Stephen B. Ackerman

(57) ABSTRACT

A power management circuit is provided with groups of switches and a single shared inductor and is selectively configured in a first mode to act as a buck regulator and a second mode to act as a buck-boost regulator. There is a two-stage circuit topology, where both charging and regular operation of the device can be optimized. There is a switching charger integrated circuit that can be dedicated to performing a charging function, and there is a DC-DC power management integrated circuit that can be dedicated to regulating the system voltage provided by the battery while the battery is discharging.

24 Claims, 6 Drawing Sheets

POWER MANAGEMENT CIRCUIT

TECHNICAL FIELD

The present disclosure relates to power management circuit and in particular but not exclusively to a power management circuit that provides switching charging functions and DC-DC conversion functions to a device, together with corresponding control methods.

BACKGROUND

It is known to provide a two-stage power management topology for battery-powered devices. An example of this is shown in FIG. 1 where a power management circuit comprises a switching charger integrated circuit 100 and a DC-DC power management integrated circuit 102. The switching charger 100 comprises a buck converter and is optimised for efficient charging of a battery 104. The DC-DC power management integrated circuit 102 comprises a buck-boost converter and is optimised for providing a regulated system voltage to a device.

Each of the dedicated integrated circuits 100, 102 makes use of its own inductor. Switching converters have good power efficiency compared with linear converters. For example, a typical buck converter 100 and buck-boost converter 102 may each operate with an efficiency of around 95% in which case the total system efficiency may be around 90%.

However, having two separate power conversion stages results in more electromagnetic interference and noise as compared with single stage topologies.

SUMMARY

In such a two stage topology, both charging and regular operation of the device can be optimised. The switching charger integrated circuit 100 can be dedicated to performing a charging function, and the DC-DC power management integrated circuit 102 can be dedicated to regulating the system voltage provided by the battery while the battery is discharging. However, there is a general concern to minimise the bill of materials and area of components in such devices. This is especially the case for mobile devices such as smartphones, tablets and the like.

Therefore, it is desired to provide improvements in charging system technologies.

According to a first aspect of the disclosure there is provided a power management circuit comprising an inductor and a set switching elements, arranged to switch between a first configuration providing a switched charging functionality and a second configuration providing a DC-DC regulation functionality.

The switched charging functionality is preferably for charging a battery. The DC-DC regulation functionality is preferably for providing a system voltage. The system whose voltage is provided may comprise a mobile device such as a smartphone or tablet.

The switched charging functionality is preferably a buck regulation; and the DC-DC regulation functionality may be a buck-boost regulation.

The circuit may also be arranged to provide a USB OTG (Universal Serial Bus On the Go) power mode; or a mode for providing power from another non-mains source.

Optionally, said inductor is coupled between an inductor input node and an inductor output node; and said set of switching elements comprises: a first switch (M1) that selectively couples the input node with an input; a second switch (M2) that selectively couples the input node with a ground; a third switch (M3) that selectively couples the output node with a battery; a fourth switch (M5) that selectively couples the output node with a ground; and a fifth switch (M6) that selectively couples the input node with the battery.

Said fourth switch and said fifth switch may be held in an off state in said first configuration; and said first, second and third switches are operable to provide a switched charging functionality.

Said first and third switches are held in an off state in said second configuration, and said second, fourth and fifth switches are operable to provide a DC-DC regulation functionality.

The power management circuit may further comprise a sixth switch (M4) that selectively couples the output node with a load, for providing a power path function.

Alternatively, said inductor is coupled between an inductor input node and an inductor output node; and said set of switching elements comprises: a first switch (M1') that selectively couples the input node with an input; a second switch (M2') that selectively couples the input node with a ground; a third switch (M3') that selectively couples the output node with a battery; a fourth switch (M4') that selectively couples the output node with a load; a fifth switch (M5') that selectively couples an input with the load; and a sixth switch (M6') that selectively couples the output node with a ground.

Optionally, in said first configuration, said fifth switch (M5') is held in an off state, said first and second switches (M1', M2') are pulse width modulated, and said third, fourth and sixth switches (M3', M4', M6') are selectively operated to provide the switched charging functionality.

Optionally, in said second configuration, said fourth switch (M4') is held in an off state, said second, third and sixth switches (M2', M3', M6') are pulse width modulated, and said first and fifth switches (M1', M5') are selectively operated to provide the DC-DC regulation functionality.

According to a second aspect of the disclosure there is provided a mobile device comprising a power management circuit according to the first aspect.

According to a third aspect of the disclosure there is provided a method for controlling the power provided to a system comprising providing an inductor, providing a set of switches, and operating the switches to switch between a first configuration providing a switched charging functionality and a second configuration providing a DC-DC regulation functionality.

The switched charging functionality is preferably for charging a battery. The DC-DC regulation functionality is preferably for providing a system voltage. The system whose voltage is provided may comprise a mobile device such as a smartphone or tablet.

The switched charging functionality is preferably a buck regulation; and the DC-DC regulation functionality may be a buck-boost regulation.

The circuit may also be arranged to provide a USB OTG power mode; or a mode for providing power from another non-mains source.

According to a fourth aspect of the disclosure there is provided a power management circuit comprising an integrated buck charger and buck-boost converter.

BRIEF DESCRIPTION OF THE DRAWINGS

The present disclosure will now be described, by way of example only, with reference to supply the battery the accompanying figures in which.

DESCRIPTION

Figure 1:
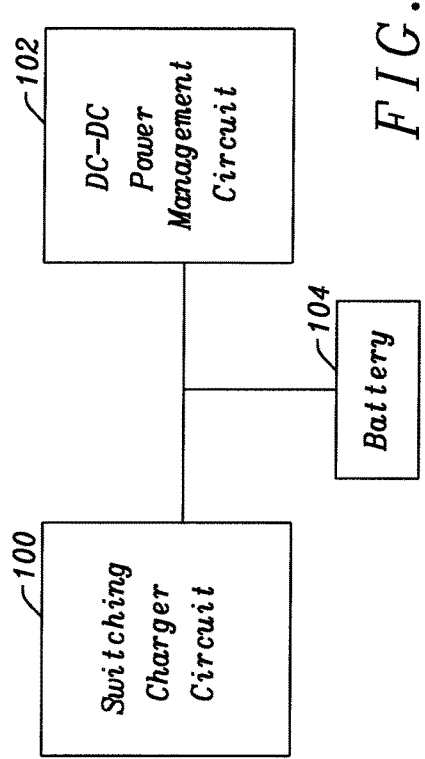
FIG. 1 shows an example of an existing two-stage power management circuit topology.
Figure 2:
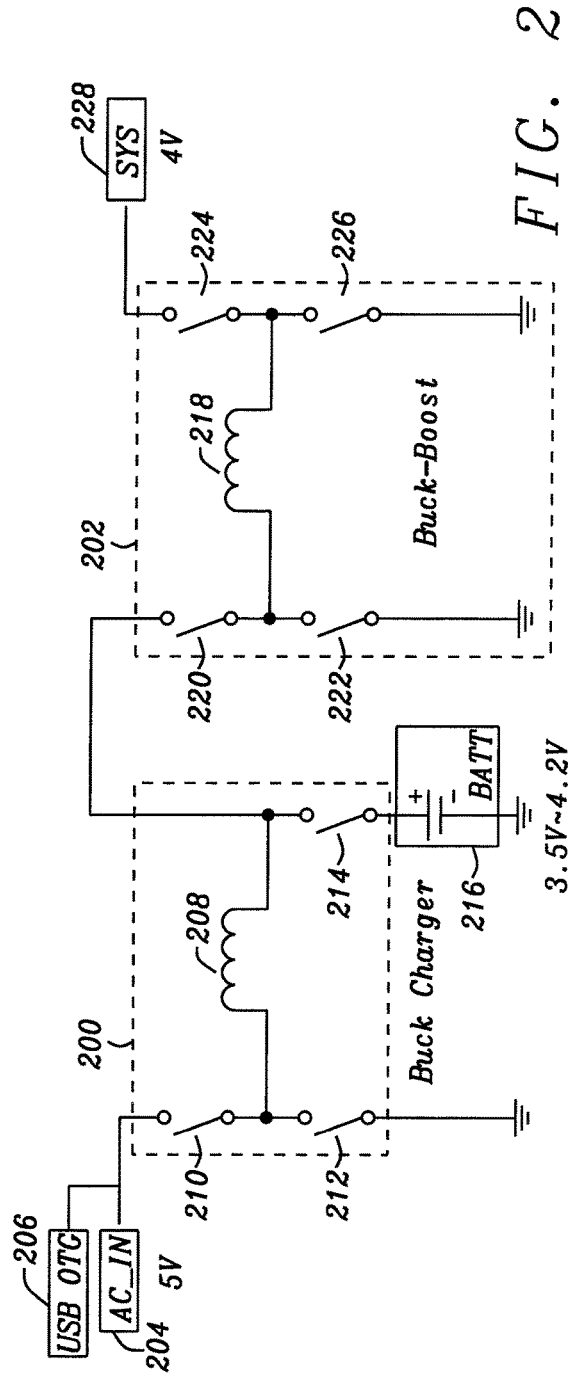
FIG. 2 shows a schematic illustration of a similar circuit to that shown in FIG. 1.

FIG. 2 shows a schematic representation of a circuit of the type similar to that shown in FIG. 1. As shown, the power conversion circuit comprises a buck charger 200 and a buck-boost converter 202. The buck charger 200 receives power from a supply which may be an AC mains input 204 or an alternative input 206 which may for example be a USB OTG (universal serial bus on the go) input. The buck charger 200 comprises an inductor 208 and a set of switches 210, 212, 214 which are operable to charge a battery 216. The switches 210, 212, 214 may be formed of any suitable switching elements such as MOSFETs (metal-oxide-semiconductor field-effect transistors). The switches 210, 212, 214 operate to selectively couple the inductor 208 with the supply 204 or 206 and the battery 216, and their operation is controlled in order to step down an input voltage to a lower output voltage for charging the battery 216. The operation of the buck converter 200 in itself is known to the person skilled in the art and so will not be described in detail herein.

The buck-boost circuit 202 comprises an inductor 218 and a set of switches 220, 222, 224, 226 which are operable to provide a buck-boost DC-DC conversion to provide power to the system 228 (SYS). The buck-boost circuit 202 either steps down the voltage from the battery 216 or steps it up depending upon the state of the battery. This is achieved by selective operation of the switches 220, 222, 224, 226 in a manner which is known to the person skilled in the art, so will not be described in detail herein. The switches 220, 222, 224, 226 may be formed of any suitable switching elements such as MOSFETs (metal-oxide-semiconductor field-effect transistors).

Different modes of the two-stage power management circuit of FIG. 2 have the following inputs and outputs:

| Mode | Input | Output |
| --- | --- | --- |
| Switching Charger | AC_IN | Battery |
| OTG Boost Converter | Battery | USB OTG Port |
| Buck-Boost Converter | Battery | Sys |
| Power Path | AC_IN or Battery | Sys |

The AC_In and USB OTG port may share a common input path.

It will be appreciated that the present disclosure is not limited to any particular current or voltage values, but for the purposes of illustration FIG. 2 shows an input voltage of 5 V; the buck 200 steps that voltage down to a desired 3.5 V for charging the battery; and the system requires an operating voltage of 4 V.

As shown in the diagram, two separate inductors 208, 218 are needed to implement both the buck-boost and buck switching charger combination and seven internal switches 210, 212, 214, 220, 222, 224, 226 are required in order to implement the power topology. Also as mentioned before, the dual inductors cause interference noise in the module.

The present inventors have devised a topology that provides both buck charging and the (buck-boost) DC-DC conversion with a single inductor and fewer switches, without the addition of any extra components, which gives a cost saving as compared with the two-stage topology illustrated in FIGS. 1 and 2.

Figure 3:
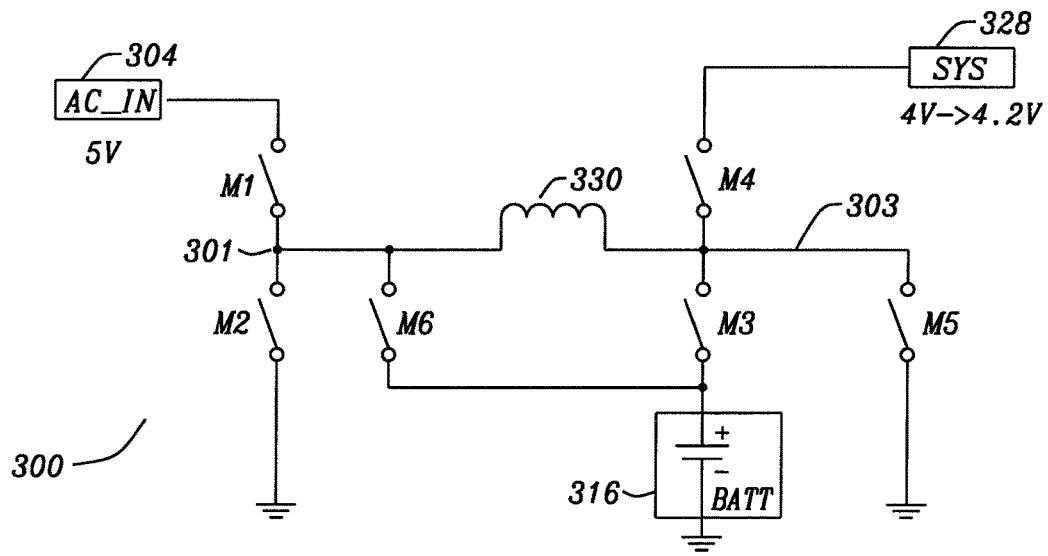
FIG. 3 shows a power management circuit according to a first embodiment of the disclosure, which provides a power path.

A first embodiment of the disclosure is illustrated in the schematic diagram of FIG. 3, showing a power conversion circuit 300. Here, the power conversion circuit 300 has the same capability as the two topology of FIGS. 1 and 2 for both charging and regular operation of the device to be optimised. It also optionally provides a power path function, whereby input power can charge both the battery and supply the system load. The power path function involves developing an additional intermediate voltage between the input and the battery which can be selectively applied via switch element M4 to charge the battery or supply power to system.

In contrast with the existing topologies as shown in FIGS. 1 and 2, the power conversion circuit 300 is provided with a single inductor 330 and a set of six first group switches (M1 through M6) as opposed to a set of seven switches 210, 212, 214, 220, 222, 224, 226 as required by the arrangement of FIG. 2.

The inductor 330 is coupled between an inductor input node 301 and an inductor output node 303. The set of switches M1 through M6 (with M4 being optional as mentioned above) are operable as will be described below to selectively ground the input and output nodes 301, 303, to selectively couple the input node 301 with an input or a battery, and to selectively couple the output node 303 with a load or the battery. The switches may also be arranged such that the inductor 330 is bypassed and the input is applied directly to either or both of the battery and the load.

A battery 316 can be charged by connection to an input power supply 304, and can also provide a system voltage 328 (also referred to as the load). This embodiment also provides a power path for direct provision of the system voltage 328 by the input supply 304. When the input 304 is removed the battery 316 may be coupled to the system voltage 328.

A set of switching elements M1 through M6 are provided and these can be operated to switch the circuit 300 between at least two different configurations, as well as being operable to provide switched converter voltage regulation. In a first configuration the circuit 300 provides a switched charger operation, where the voltage of the input power supply is stepped down to the battery charging voltage. In a second configuration, the circuit provides a DC-DC voltage regulation operation (in this illustrated case a buck-boost operation), in which the voltage supplied to the system is regulated. In each configuration, selected switches also operate to provide the buck or buck-boost functionalities.

In comparison to the known arrangement illustrated in FIGS. 1 and 2, two integrated circuits are combined together with a set of switching elements M1-M6 and a common inductor 330. The system according to this proposal saves one inductor and one switching element (such as a MOSFET) from the bill of materials required for construction of the circuit. The inductor 330 may be provided internally or externally to the circuit 300.

In a first configuration, the circuit 300 of FIG. 3 can operate as a switching charger, for instance as a buck converter specialised for a charging operation. In this mode, switches M5 and M6 will be held in an off state. Switches M1 and M2 will be pulse width modulated to provide the required operational characteristics. In one embodiment M1 could comprise a PMOS FET and M2 could comprise an NMOS FET although it will be appreciated that other types of switching elements may be used and that in general the polarities of the components may be reversed. Switches M3 and M4 are controlled for operation of the voltage regulation.

Figure 4:
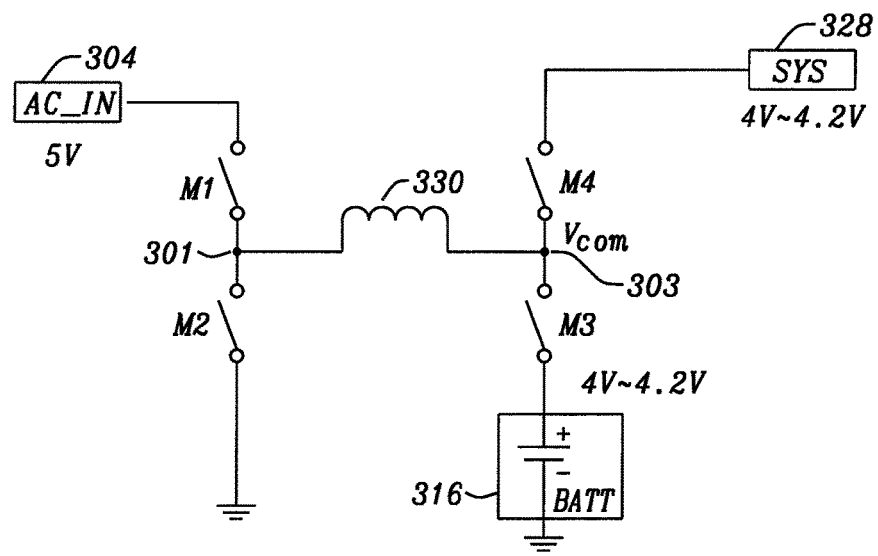
FIG. 4 illustrates a first mode of operation of the circuit of FIG. 3.

To assist with the understanding of this mode of operation, FIG. 4 illustrates a selection of the components of FIG. 3. Because M5 and M6 are permanently switched off they are excluded from this diagram. FIG. 4 illustrates the operation of the buck switching charger mode. Here, the buck provides a constant current to the battery and the voltage at intermediate node VCOM will follow the battery voltage as it is charged. The system will not operate when the battery is below a certain voltage threshold (for example, 3.6V). If the battery is not present the system can still operate if an AC input 304 is provided.

The switching elements M1 and M2 are designed for pulse width modulation operation and are configured according to the external system voltage VSYS. For charging, the voltage at node VCOM provides constant current or constant voltage for the battery, which may be provided via different average current and voltage regulation loops. For system bypass, the voltage at node VCOM provides the power delivery to the system voltage VSYS through the switching element M4. It is also possible for the switching elements M3 and M4 to be implemented with overcurrent and/or overvoltage protection.

Figure 5:
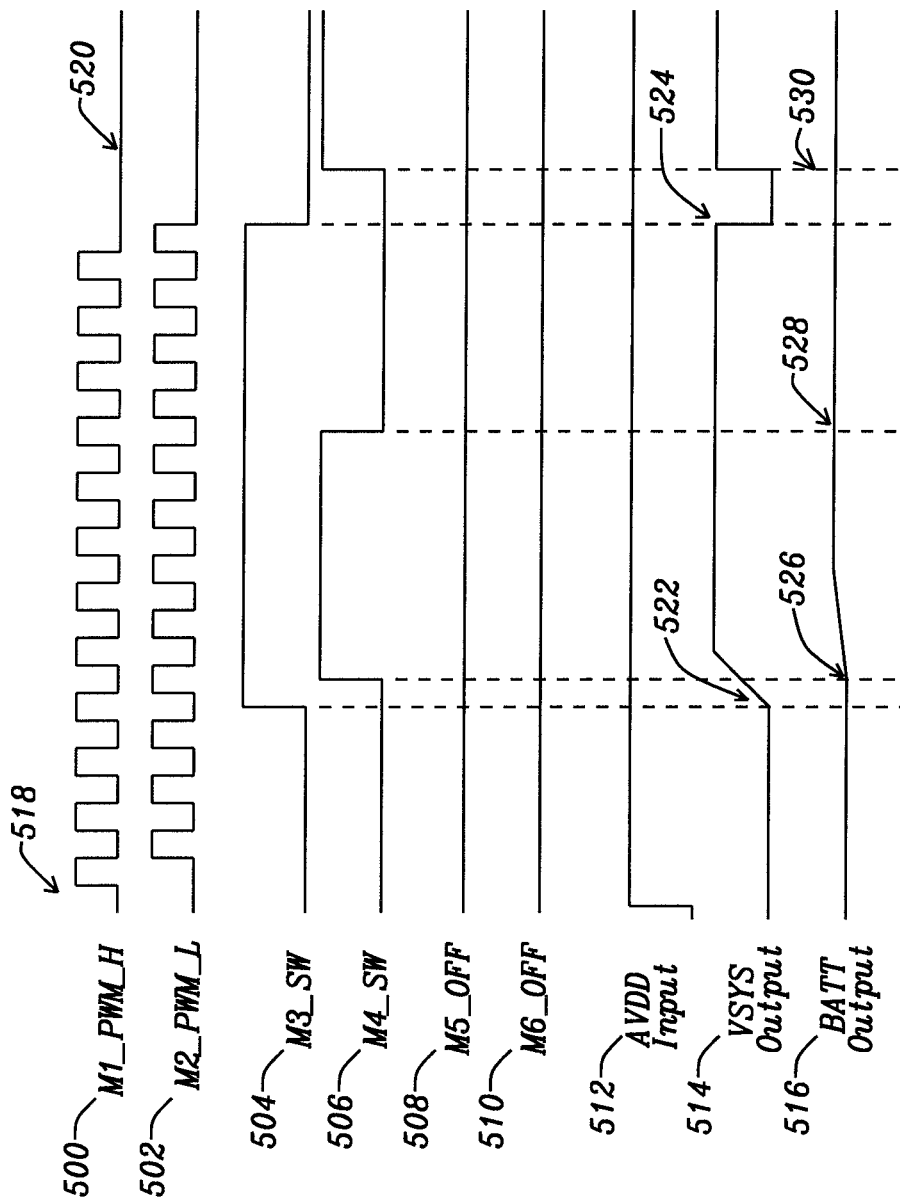
FIG. 5 is a timing diagram illustrating further aspects of the mode of operation shown in FIG. 4.

FIG. 5 shows a timing diagram of the switches according to the embodiment of FIG. 4, with trace 500 showing the pulse width modulated operation of high-side switch M1, 502 showing the pulse width modulated operation of low-side switch M2, trace 504 showing the operation of switch M3, 506 showing the operation of switch M4, traces 508 and 510 showing switches M5 and M6 respectively (which are permanently in the off state for the mode of operation illustrated in FIG. 4), trace 512 showing an analog supply voltage (AVDD) power supply input, trace 514 showing the system voltage (VSYS) output provided to the system 328, and trace 516 showing the battery output voltage.

The buck converter is enabled at time 518 and disabled at time 520. The VSYS is enabled at 522 and disabled at 524. The VBATT charging is enabled at 526 and disabled at 528. Time 530 shows when VSYS is supplied from the battery 316.

Figure 6:
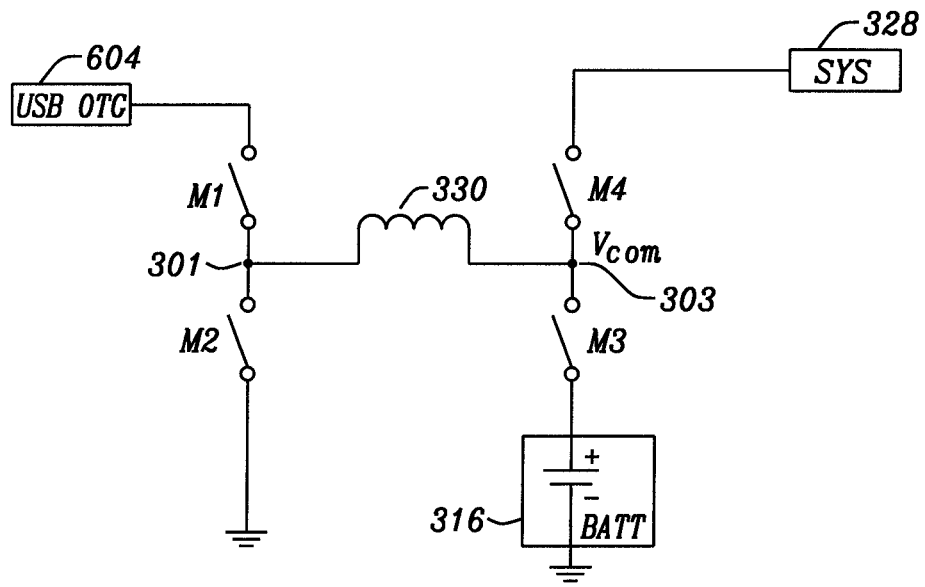
FIG. 6 illustrates a second mode of operation of the circuit of FIG. 3.

According to optional embodiments of the disclosure, the circuit may supply power from an alternative source. One example such an alternative power supply is a USB OTG supply. In the OTG mode, switches M1 through M6 will be configured in a similar manner to that of the switching charger mode, that is, switches M5 and M6 will be off, M1 and M2 will be pulse width modulated and M3 and M4 will be selectively switchable for regulation operations. FIG. 6 illustrates a circuit to assist the understanding of this mode of operation, and includes selected components from FIG. 3. M5 and M6 are held in an off state in this mode of operation and so are excluded from this figure. This figure is similar to that of FIG. 4 except that the AC mains supply is replaced by a USB OTG input 604.

Here, the battery 316 provides USB 5 V power under OTG operation. M3 and M4 may provide a system voltage bypass from the battery and M3, M1 and M2 may be switched to provide an OTG boost operation. For system bypass the battery voltage VBATT provides power delivery to VSYS through M3 and M4. Again, M3 and M4 could be implemented with overcurrent and/or overvoltage protection.

In a further mode of operation, the circuit of FIG. 3 can operate as a DC-DC converter, for instance as a DC-DC converter optimised for providing a regulated system voltage. In this mode, switching elements M1 and M3 are held in an off state and the other switches M2, M4, M5 and M6 are pulse width modulated. In a preferred embodiment each of the switching elements M2, M4, M5 and M6 may comprise NMOS FETs. However it is to be appreciated that other switching elements may be used if desired.

Figure 7:
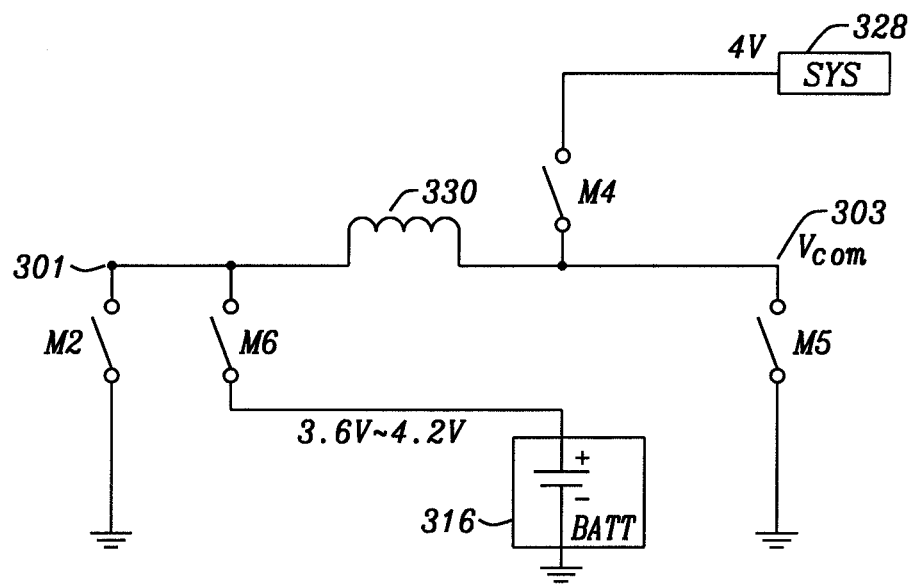
FIG. 7 illustrates a third mode of operation of the circuit of FIG. 3.

To assist with the understanding of this mode of operation, FIG. 7 illustrates a selection of the components of FIG. 3. Because M1 and M3 are permanently held in an off state they are excluded from this diagram. A buck mode is provided by switches M2, M6 and M4, and a boost mode is provided by switches M6, M4 and M5. This circuit provides a buck-boost converter operation with a high efficiency.

Figure 8:
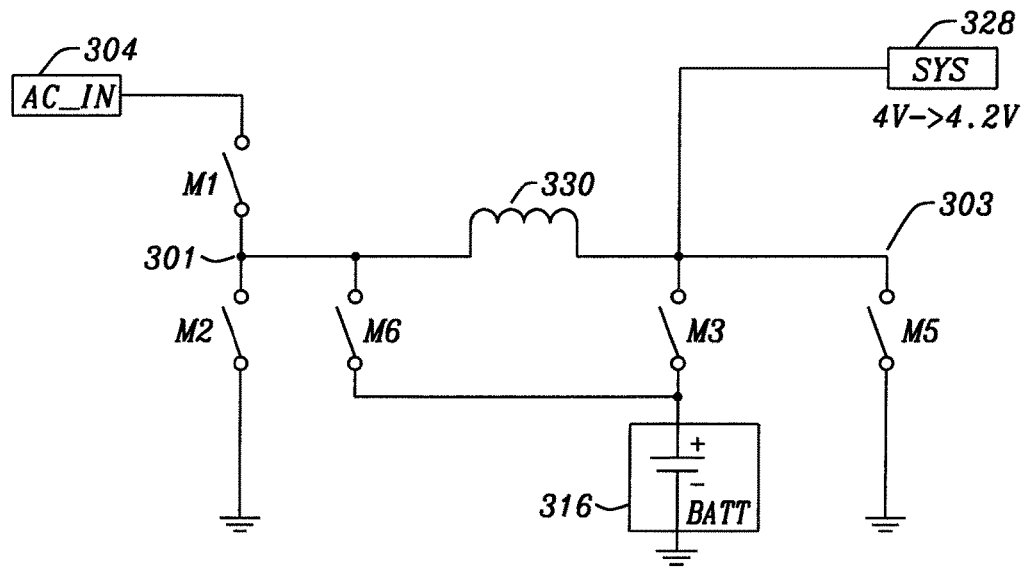
FIG. 8 shows a power management circuit according to a first embodiment of the disclosure, in which no power path is provided.

FIG. 8 shows a power management circuit according to a second embodiment of the disclosure, in which no power path is provided. This is similar to the first embodiment illustrated in FIG. 3, except that the switching element M4 is omitted so that the development of an intermediate voltage and its selective application to charge the battery or supply the system is not provided.

According to this novel arrangement the power circuit is provided with a single inductor 330 and a set of five switches M1, M2, M3, M5, M6 as opposed to a set of seven switches as required by the arrangement of FIG. 2.

There are various different arrangements that may be contemplated according to the general principles of the disclosure. A further example embodiment shown in FIG. 9, which provides a power path function. Here, a single inductor 330 is shared between a buck switching charger mode and a buck-boost mode, with second group switches M1' through M6' controlling the operation. In a switching charger mode of operation, switch M5' is held in an off state, switches M1' and M2' are operated according to a pulse width modulated scheme, and switches M3', M4' and M6' are selectively operated to provide the buck regulating function. In a preferred embodiment M1' may be a PMOS MOSFET and M2 may be an NMOS MOSFET although it will be appreciated that other switching elements may be used and the polarities may be reversed.

In an optional USB OTG (or other alternative power supply) mode, the switches M1' through M6' are operated in a similar way as to the switching charger mode, except that M4' is held in an off state. The AC input 804 is replaced by a USB OTG input.

In a buck-boost mode, switch M4' is held in an off state and switches M2', M3' and M6' are controlled according to a pulse width modulated mode of operation. In one embodiment switches M2', M3' and M6' may be NMOS FETs although it will be appreciated that other switching elements may be used and that in general the polarities of the elements may be reversed. Switches M1' and M5' are selectively operated to provide the buck-boost regulating function.

Figure 9:
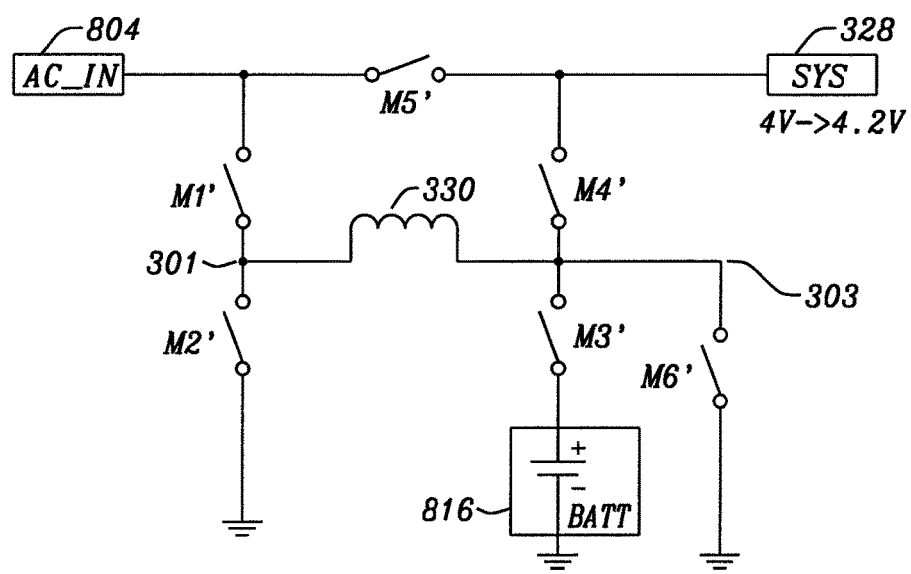
FIG. 9 illustrates a power management circuit according to an alternative embodiment of the disclosure.

It is also possible to provide an alternative embodiment as a variation of that of FIG. 9 but without a power path, that is, with switch element M4' being omitted. Here, the functions of M5' and M6' are the same but the circuit is only operated in buck-boost mode.

Figure 10:
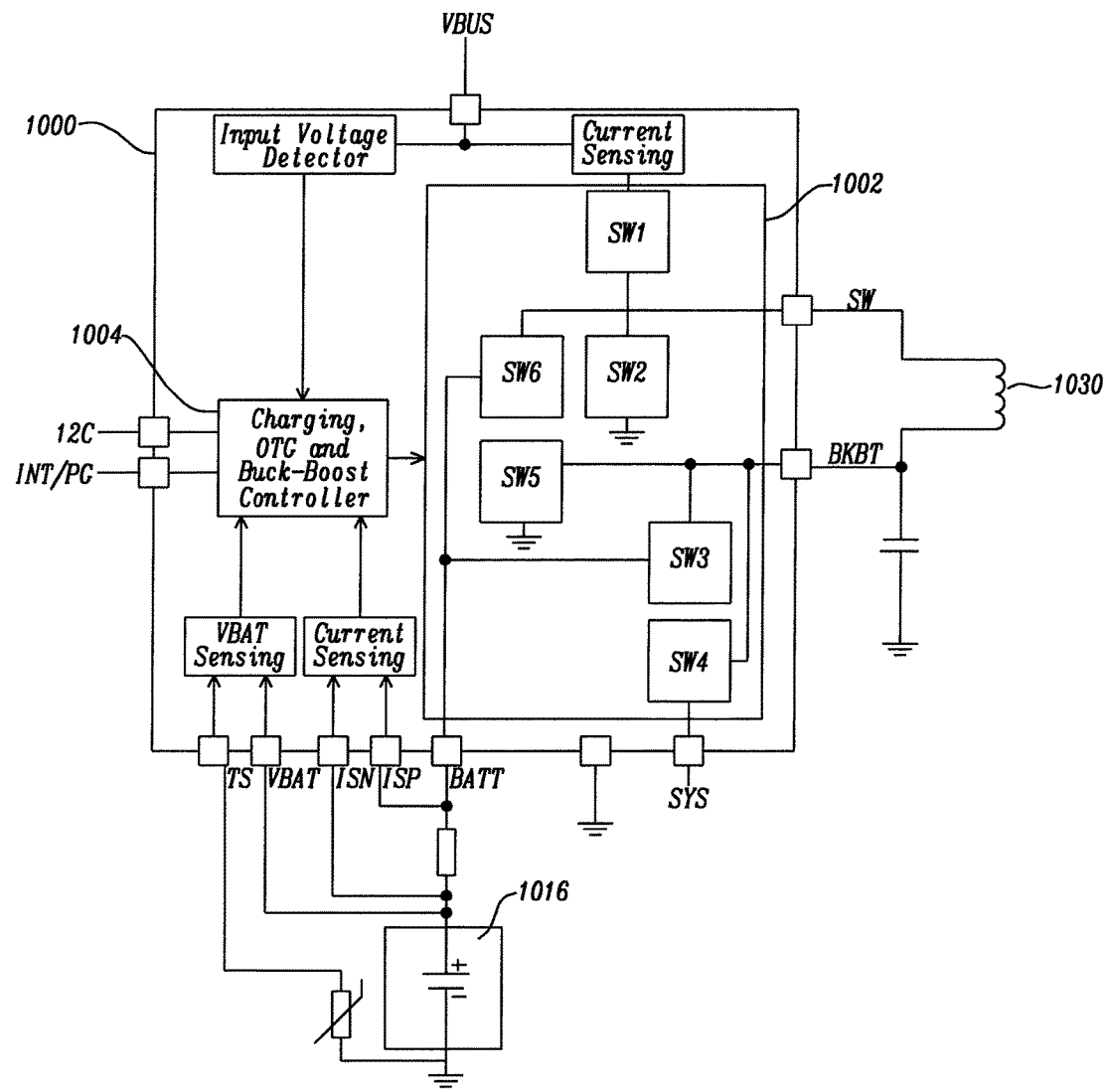
FIG. 10 illustrates an example system layout.

FIG. 10 illustrates an example system implementation according to the disclosure. The power management circuit 1000 comprises a switch module 1002 where switches SW1 through SW6 correspond to M1 through M6 as illustrated in FIGS. 3 to 8 or M1' through M6' as illustrated in FIG. 9. The battery is shown at 1016. The switch module 1002 is coupled with a single external inductor 1030. Operation of the switches SW1 through SW6 in the switch module 1002 is controlled by a controller 1004. The controller 1004 operates the switches SW1 through SW6 to switch the circuit between different configurations as described above. The controller 1004 is programmed to implement the methods which enable the novel topology of the disclosure to be used.

The reduction of components according to the present disclosure as compared with existing two-stage topologies provides a significant advantage. It allows the pin assignment of the integrated circuit to be compacted and allows for the overall integrated circuit (IC) package to be shrunk.

Various modifications may be made to the above departing from the scope of the disclosure.

What is claimed is:

1. A power management circuit comprising an inductor and a set of switching elements, arranged to switch between a first configuration providing a switched charging functionality adapted to charge a battery and a second configuration providing a DC-DC regulation functionality;
   wherein the inductor is coupled between an inductor input node and an inductor output node;
   wherein the set of switching elements comprises
   a first switch that selectively couples the input node with an input;
   a second switch that selectively couples the input node with a ground;
   a third switch that selectively couples the output node with the battery;
   a fourth switch that selectively couples the output node with a ground;
   a fifth switch that selectively couples the input node with the battery; and
   a sixth switch that selectively couples the output node with a load;
   wherein the fifth switch has a first terminal coupled to the input node and a second terminal connected to the third switch and the battery.

2. The power management circuit of claim 1, wherein the DC-DC regulation functionality is for providing a system voltage.

3. The power management circuit of claim 1, wherein the system whose voltage is provided comprises a mobile device such as a smartphone or tablet.

4. The power management circuit of claim 1, wherein the switched charging functionality is a buck regulation.

5. The power management circuit of claim 1, wherein the DC-DC regulation functionality is a buck-boost regulation.

6. The power management circuit of claim 1, being arranged to provide a USB OTG power mode, or a mode for providing power from another non-mains source.

7. The power management circuit of claim 1, wherein said fourth switch and said fifth switch are held in an off state in said first configuration; and said first, second and third switches are operable to provide a switched charging functionality.

8. The power management circuit of claim 1, wherein said first and third switches are held in an off state in said second configuration, and second, fourth and fifth switches are operable to provide a DC-DC regulation functionality.

9. The power management circuit of claim 1, wherein said set of switching elements comprises:
   a seventh switch that selectively couples an input with the load.

10. The power management circuit of claim 9, wherein, in said first configuration, said seventh switch is held in an off state, said first and second switches are pulse width modulated, and said third, fourth and sixth switches are selectively operated to provide the switched charging functionality.

11. The power management circuit of claim 9, wherein, in said second configuration, said sixth switch is held in an off state, said second, third and fourth switches are pulse width modulated, and said first and seventh switches are selectively operated to provide the DC-DC regulation functionality.

12. A mobile device comprising a power management circuit comprising an inductor and a set of switching elements, arranged to switch between a first configuration providing a switched charging functionality adapted to charge a battery and a second configuration providing a DC-DC regulation functionality;
   wherein the inductor is coupled between an inductor input node and an inductor output node;
   wherein the set of switching elements comprises
   a first switch that selectively couples the input node with an input;
   a second switch that selectively couples the input node with a ground;
   a third switch that selectively couples the output node with the battery;
   a fourth switch that selectively couples the output node with a ground;
   a fifth switch that selectively couples the input node with the battery; and
   a sixth switch that selectively couples the output node with a load;
   wherein the fifth switch has a first terminal coupled to the input node and a second terminal connected to the third switch and the battery.

13. A method for controlling the power provided to a system comprising providing an inductor, providing a set of switches, and operating the switches to switch between a first configuration providing a switched charging functionality adapted to charge a battery and a second configuration providing a DC-DC regulation functionality;
   wherein the inductor is coupled between an inductor input node and an inductor output node;
   wherein the set of switching elements comprises
   a first switch that selectively couples the input node with an input;
   a second switch that selectively couples the input node with a ground;
   a third switch that selectively couples the output node with the battery;
   a fourth switch that selectively couples the output node with a ground;
   a fifth switch that selectively couples the input node with the battery; and
   a sixth switch that selectively couples the output node with a load;

wherein the fifth switch has a first terminal coupled to the input node and a second terminal connected to the third switch and the battery.

14. The method of claim 13, wherein the DC-DC regulation functionality is for providing a system voltage.

15. The method of claim 13, wherein the system whose voltage is provided comprises a mobile device such as a smartphone or tablet.

16. The method of claim 13, wherein the switched charging functionality is a buck regulation.

17. The method of claim 13, wherein the DC-DC regulation functionality is a buck-boost regulation.

18. The method of claim 13, wherein the circuit provides a USB OTG power mode or a mode for providing power from another non-mains source.

19. The method of claim 13, wherein said fourth switch and said fifth switch are held in an off state in said first configuration; and said first, second and third switches are operable to provide a switched charging functionality.

20. The method of claim 13, wherein said first and third switches are held in an off state in said second configuration, and said second, fourth and fifth switches are operable to provide a DC-DC regulation functionality.

21. The method of claim 13, wherein said set of switching elements comprises:
a seventh switch that selectively couples an input with the load.

22. The method of claim 21, wherein, in said first configuration, said seventh switch is held in an off state, said first and second switches are pulse width modulated, and said third, fourth and sixth switches are selectively operated to provide the switched charging functionality.

23. The method of claim 21, wherein, in said second configuration, said sixth switch is held in an off state, said second, third and fourth switches are pulse width modulated, and said first and seventh switches are selectively operated to provide the DC-DC regulation functionality.

24. A power management circuit comprising an integrated buck charger and buck-boost converter; wherein the integrated buck charger and buck-boost converter comprises an inductor and a set of switching elements, arranged to switch between a first configuration providing a switched charging functionality adapted to charge a battery and a second configuration providing a DC-DC regulation functionality;
wherein the inductor is coupled between an inductor input node and an inductor output node;
wherein the set of switching elements comprises
a first switch that selectively couples the input node with an input;
a second switch that selectively couples the input node with a ground;
a third switch that selectively couples the output node with the battery;
a fourth switch that selectively couples the output node with a ground;
a fifth switch that selectively couples the input node with the battery; and
a sixth switch that selectively couples the output node with a load;
wherein the fifth switch has a first terminal coupled to the input node and a second terminal connected to the third switch and the battery.

* * * * *

UNITED STATES PATENT AND TRADEMARK OFFICE
CERTIFICATE OF CORRECTION

PATENT NO.       : 10,348,112 B2
APPLICATION NO.  : 15/267259
DATED            : July 9, 2019
INVENTOR(S)      : Pei-Cheng Huang and Alan Somerville It is certified that error appears in the above-identified patent and that said Letters Patent is hereby corrected as shown below:

On the Title Page

Item (12), "Somerville et al." should read -- Huang et al. --.

In the Inventors (72), delete "Alan Sommerville, Chippenham (GB)"; "Pei-Cheng Huang, Taipei (TW)" and replace with -- Pei-Cheng Huang, Taipei City, Taiwan; Alan Somerville, Chippenham, United Kingdom --.

Signed and Sealed this
Twenty-second Day of October, 2019

Andrei Iancu
*Director of the United States Patent and Trademark Office*